US012473119B2

(12) United States Patent
Van Boom et al.

(10) Patent No.: US 12,473,119 B2
(45) Date of Patent: Nov. 18, 2025

(54) PRESSURE SENSITIVE PRINTABLE PAPER PRODUCTS AND THEIR USE WITH PACKAGING AND CONTAINERS (71) Applicants: Joel Van Boom, Franklin, TN (US); William R. Krahl, Baldwinsville, NY (US)

(72) Inventors: Joel Van Boom, Franklin, TN (US); William R. Krahl, Baldwinsville, NY (US)

(*) Notice: Subject to any disclaimer, the term of this patent is extended or adjusted under 35 U.S.C. 154(b) by 0 days.

(21) Appl. No.: 18/650,365

(22) Filed: Apr. 30, 2024

(65) Prior Publication Data
US 2024/0351737 A1  Oct. 24, 2024

Related U.S. Application Data (63) Continuation of application No. 17/118,389, filed on Dec. 10, 2020, now Pat. No. 11,999,540, which is a continuation of application No. PCT/US2019/036300, filed on Jun. 10, 2019.

(60) Provisional application No. 62/683,330, filed on Jun. 11, 2018.

(51) Int. Cl.
*B65D 33/34* (2006.01)
*B65D 5/00* (2006.01)
*B65D 5/42* (2006.01)
*B65D 5/62* (2006.01)
*B65D 30/08* (2006.01)

(52) U.S. Cl.
CPC .............. *B65D 5/62* (2013.01); *B65D 5/0085* (2013.01); *B65D 5/4233* (2013.01); *B65D 31/02* (2013.01); *B65D 33/34* (2013.01)

(58) Field of Classification Search
CPC .. B65D 33/004; B65D 33/34; B65D 33/1691; B65D 5/0236; B65D 5/62; B65D 5/4233; B65D 25/205; B65D 2203/02
USPC ........................................................ 229/126
See application file for complete search history.

(56) References Cited

U.S. PATENT DOCUMENTS

| 3,025,167 A | 3/1962 | Butler |
| 3,515,270 A | 6/1970 | Tonn et al. |
| 4,609,571 A | 9/1986 | Tytke |
| 4,679,693 A | 7/1987 | Forman |
| 4,785,940 A | 11/1988 | Wilson |

(Continued)

FOREIGN PATENT DOCUMENTS

| CN | 102352151 B | 11/2013 |
| DE | 2063073 | 6/1972 |

(Continued)

*Primary Examiner* — Nathan J Newhouse
*Assistant Examiner* — Nina K Attel
(74) *Attorney, Agent, or Firm* — ONE LLP (57) ABSTRACT This disclosure is concerned with pressure sensitive adhesive printable paper products, such as labels, and their use with various substrates, such as packaging and containers, including food containers. This disclosure is also concerned with repositionable pressure sensitive adhesive printable paper products and their transformation into semi-permanent or permanent adhesive products with respect to such substrates. This disclosure is also concerned with food and drink containers, methods of making them and their use with removable or repositionable adhesive labels. More particularly, this disclosure is concerned with containers for food or drink having chemical functionality, such as in coatings, to facilitate the use of adhesive labels with such containers.

19 Claims, 7 Drawing Sheets

(56) References Cited

U.S. PATENT DOCUMENTS

| | | |
|---|---|---|
| 4,998,666 A | 3/1991 | Ewan |
| 5,580,624 A | 12/1996 | Andersen et al. |
| 5,608,949 A | 3/1997 | Cooley et al. |
| 5,866,183 A | 2/1999 | Small |
| 6,398,028 B1 | 6/2002 | Stovall |
| 9,058,753 B2 | 6/2015 | Van Boom et al. |
| 9,437,122 B2 | 9/2016 | Van Boom et al. |
| 9,925,815 B2 | 3/2018 | Van Boom et al. |
| 2003/0081865 A1 | 5/2003 | Baker et al. |
| 2006/0208045 A1 | 9/2006 | Chandaria |
| 2008/0156859 A1 | 7/2008 | Glasgow |
| 2009/0047500 A1 | 2/2009 | Maeda |
| 2011/0211778 A1 | 9/2011 | Zerfas et al. |
| 2013/0056469 A1 | 3/2013 | Davis et al. |
| 2013/0292353 A1 | 11/2013 | Stanley et al. |
| 2015/0016758 A1 | 1/2015 | Rummo |
| 2019/0352055 A1 | 11/2019 | Tan |

FOREIGN PATENT DOCUMENTS

| | | |
|---|---|---|
| FR | 2 701 922 A1 | 9/1994 |
| GB | 2 330 574 A | 4/1999 |
| WO | WO PCT/US19/36300 | 10/2019 |

PRESSURE SENSITIVE PRINTABLE PAPER PRODUCTS AND THEIR USE WITH PACKAGING AND CONTAINERS

CROSS-REFERENCE TO RELATED APPLICATIONS

The subject application is a continuation of U.S. patent application Ser. No. 17/118,389, filed Dec. 10, 2020, which is a continuation of PCT Patent Application No. PCT/US19/36300, filed Jun. 10, 2019, which claims priority to U.S. Provisional Patent Application No. 62/683,330, filed on Jun. 11, 2018, all of which are incorporated by reference herein in their entirety for all purposes.

FIELD

This disclosure is concerned with pressure sensitive adhesive printable paper products, such as labels, and their use with various substrates, such as packaging and containers, including food containers. This disclosure is also concerned with repositionable pressure sensitive adhesive printable paper products and their bonding transformation into non-repositionable or semi-permanent or permanent adhesive products with respect to such substrates that are to be tagged, labeled, or sealed. This disclosure is also concerned with food and drink containers, methods of making them, and their use with removable or repositionable adhesive labels. More particularly, this disclosure is concerned with containers for food or drink having chemical functionality, such as from coatings, to facilitate the use of adhesive labels with such containers.

BACKGROUND

Pressure sensitive labels adhere to substrates to which they are applied by pressure. The adhesive of such labels can be temporary, making the label removable or repositionable, or permanent. Removable or repositionable adhesive labels are very useful in circumstances where easy removal of the label is required. As linerless or self-wound labels they are relatively easy to handle, and they can be used in high speed printers. But they have limited usage determined by their tack or ability to bond to substrates. The surface characteristics of some substrates can limit the usefulness of such labels.

There is a drive to make all types of packaging and containers less expensive, disposable, and recyclable. Such materials and their products tend to have surfaces that are rough, fibrous, and/or uneven. It can be difficult to get labels to adhere sufficiently to such surfaces, especially without increasing cost and, in particular, environmental concerns. Materials that meet the commercial suitability of food and drink containers also present various challenges and problems. For example, the fact that food or drink will touch surfaces of such containers, raises regulatory issues, such as compliance with FDA regulations. Cost, disposability, environmental concerns, such as biodegradability and recycling issues, are also important in the food industry.

Furthermore, disposable food and drink containers are typically provided nested together, which means that the exterior surfaces are in contact with the food contact surfaces. This requires that all such surfaces meet regulatory requirements. Also, many of the locations where such containers are used, such as fast food operations, supermarkets and the like, use disposable containers. The foregoing requirements typically result in containers that are made from fibrous materials, such as paper or other natural products, which are produced with uneven and/or fibrous surfaces that are rather rough. Such locations or businesses also often require labels to be stuck to the food containers, which may be temporary or repositionable, for the purposes of indicating data, such as weight, price, and identity of the food and/or customer. It can be challenging to design such labels that function reliably in contact with such containers, because the labels are difficult to stick to the containers.

Hitherto, repositionable linerless labels have been limited by the above described characteristics. A separate and discrete category of products use semi-permanent or permanent adhesives to provide the degree of adhesion to adhere reliably to difficult surfaces. Unfortunately, many of such self-wound label adhesives foul printers and contain silicone, which is environmentally harmful.

SUMMARY

This disclosure provides methods of transforming the bond of removable or repositionable adhesive printable paper products into those with the performance of semi-permanent or permanent adhesives. These systems provide advantages of case of handling while the product remains repositionable where needed, because of its relatively low tack that does not stick to hands or gloves while the product is being used or otherwise handled. This disclosure allows the transformation of a repositionable printable paper adhesive product into one that has such different adhesion that it may act as one that is no longer readily repositionable. This change in adhesion in such products combines the advantages of the repositionable handling benefits and use in printers that would be fouled by stronger adhesives with the performance of a stronger adhesive product. Hitherto, these two categories of pressure sensitive adhesive (removable/permanent or the like) have been regarded as separate and distinguishable products requiring different printers. This disclosure provides a system having such dual functionality or characteristics. More particularly, this disclosure provides a transitionable product with the characteristics of both a non-permanent and permanent pressure sensitive adhesive.

This disclosure provides a method of transforming or converting a printable paper product, such as a label and in particular a linerless label, bearing a repositionable or temporary pressure sensitive adhesive into one performing like a semi-permanent or permanent adhesive, which comprises providing a second product having a surface having chemical functionality selected to interact with the pressure sensitive adhesive to achieve such transformation or conversion, which method further comprises bringing the paper product into contact with the surface of the second product. This disclosure also provides improving the adhesion of items using other types of adhesives, such as permanent pressure sensitive adhesives.

This disclosure also provides packaging and containers treated with or comprising at least one composition capable of transforming or converting a repositionable or temporary pressure sensitive adhesive product into a product that performs as if the adhesive is a semi-permanent or permanent adhesive.

Thus, this disclosure provides the preparation of a surface so that an already sticky object will bond to the prepared surface multiple times stronger.

Typically, in such systems, the composition has an affinity for the adhesive of the pressure sensitive adhesive or sticky surface. This may be achieved by a common chemical functionality between the composition and the pressure sensitive adhesive.

The adhesive paper product herein may be a bag tag or label, a shipping label, a tamper evident device, a tape or a label conveying or for conveying information. In general, products containing a sticky surface will have a greater bond with use of this system.

The adhesive paper products herein may be silicone free. Silicone is commonly used as a release liner, particularly in connection with adhesive paper products having higher strength adhesive. Silicone tends to foul printers and separating the silicone-based release coating so that the paper can be recycled is difficult and expensive.

The methods and products herein may provide a peel strength increase in the pressure sensitive adhesive of from about 1.5 to about 6 times, for example from about 2 times to about 5 times, determined according to ASTM method D3330 (Method F).

This disclosure also provides methods of and systems using the above functionality for improving the adhesion of repositionable printable paper adhesive products, such as labels, to surfaces of other products that otherwise diminish the adhesion of such labels. Such surfaces may be rough, fibrous or uneven, such as having projections or ridges.

These effects are useful in businesses or industries using repositionable printable paper adhesive products, such as label media, having a relatively a low tack pressure sensitive adhesive. These effects also satisfy the needs of certain industries that require stickier or tackier adhesive in connection with labels, tags, tape and the like.

This disclosure provides systems using such repositionable printable paper adhesive products, for example in the food service industry, such as restaurants, hospitals, fast food locations and food delivery. These systems are therefore suitable for take-out orders, labeling of food items on scales or otherwise in supermarket and deli operations and the like.

Such repositionable printable paper adhesive products can be used to create a tamper evident seal, for example on packaging or containers by virtue of the change in adhesion.

This disclosure provides systems in which a substrate has a functional coating applied thereto, or such functionality may be incorporated in the manufacture of the substrate, so as to present the effect to the pressure sensitive adhesive of a tag, label or tape.

Such coatings may coatings work best when applied with pressure. This may be done with a flexographic or offset print process where the coating can be pressed into the packaging or container materials. These printing processes allow for such coatings to be flood coated over the entire surface or coated in a limited area of the surface, which would help reduce costs. The coating can be applied by spraying, infusing or mixing the coating in with the packaging or container materials.

According to this disclosure, the pressure sensitive adhesive has a strong attraction to or affinity for the functional component of the substrate or a surface of the other product. Typically, the functional component is hydrophilic and comprises an adhesive promotor and a hydrophilic adhesion enhancement compound. The former insures a link with the functional component. Accordingly, a permanent change of the surface energy of the other product can be achieved. This leads to an increased interaction capability of the functional component and leads to better adhesion. The system may be achieved with the functional component and the pressure sensitive adhesive having common resins and/or polymers.

For example, when using an acrylic adhesive in the paper product or label it is generally desirable that the functionality also be of an acrylic nature. That functionality may be derived from styrene butadiene and rubber; acrylics; styrene acrylic, polyvinyl alcohol; polyvinyl acetate; or polyurethane dispersions.

The functional component, compound, or composition disclosed herein may comprise amorphous silica, for example in about 1 to 40% dry weight of the composition, preferably about 3 to 20%, and a binder that may comprise about 50 to 95% dry weight and may be acrylic, vinyl acetate, urethane or polyvinyl alcohol or an acrylonitrile or a copolymer of styrene-butadiene in combination with an aninoplast resin, an aliphatic epoxy resin or the like. The particle size of the composition may be about 100 to 1000 nm, preferably about 200-500 nm.

Another feature of this disclosure is the use of labels or tapes and the like as tamper evident systems, preferably in connection with packaging or containers for food items and delivery bags, which may also be for food or other items.

Fast food and take-out food delivery is a rapidly growing market. One big concern is how to seal the bag so that the driver does not eat some of the food. A repositionable seal will not suffice. Typically, vendors would choose a permanent adhesive to seal the bag. They also have to write on the labels and the package to identify the order. This is a very inefficient process. This disclosure provides bags, packaging and containers having at least an area of the functionality described herein, typically in the form of a coating. That area is where the repositionable tapes or labels described herein are placed may be marked by an indicator, such a color, to show where the tape or label should be placed. The area may be adjacent the opening or on the side of the bag, packaging, or container. The tape or label is used to seal at least a portion of the opening so at to not allow entry by hand without damage to the tape or label or the bag or container. For example, the tape or label may extend across the opening or, in the case of a bag by folding the opening over to close the opening and then attaching the folded portion to the side of the bag. The tape or label can provide information about the destination/customer and, optionally, the order. Transforming the removable label into a more permanent label is an effective closure. For example, the label or tape may comprise the repositionable pressure sensitive adhesive described above herein interacting with the functionality of the substrate, in this case a bag, packaging, or container, especially for foods. For example, claim shell type food containers may be filled with food and the lid latched closed. The label or tape may extend over that closure and in reacting with the functional feature provided to the outer surface of the container the repositionable pressure sensitive adhesive bond is converted to one sufficient tack or strength such that the label or tape cannot be peeled from the container or packaging without damage thereto thus indicating tamper evidence for the contents, for example, when someone tries to open the container. The same effect may be achieved for locking and labeling using a permanent pressure sensitive label or tape to adhere to the packaging or container.

This disclosure provides bags formed of a material and comprising sidewalls extending upwardly to upper edges forming an opening that permits items to be placed in the bag, at least one of the sidewalls having at least one zone coated with a composition adapted to interact with the adhesive of a repositionable pressure sensitive adhesive label to increase the bonding of such a label to the bag compared to such bonding to the material of the bag.

The material of the bag may make the outer surface of the bag rough or fibrous.

The bags may comprise at least one such zone adjacent a first upper edge of the bag and another such zone adjacent a second opposing upper edge of the bag, so that such a label can bridge the opening of the bag and close the first and second edges by applying adhesive to the locations of the zones. There may be two such zones spaced apart and adjacent each of the first and second upper edges so that two such labels can be used to close the opening.

The bag may comprise at least one such zone adjacent a first upper edge of the bag and at least one another such zone on at least one of the sidewalls, so that the top of the bag can be folded over to bring the upper edges into proximity with the at least another zone whereby the opening of the bag can be closed by at least one such label bridging the at least one such zone adjacent a first upper edge of the bag and the at least one another such zone on at least one of the sidewalls by applying adhesive to the respective zones.

The bags may further comprise at least one repositionable pressure sensitive adhesive label applied to said zones and closing the bag by becoming non-repositionable by interaction with the coating of the zones. At least one label may be provided with information on the contents of the bag and/or destination for delivery of the bag.

The bag can be such that it cannot be opened to access contents without tearing the label or labels or disrupting the surface of the bag, such that the bag is tamper evident.

The zones may be made apparent by indicia indicating their location, such by the use of color, a logo, or other graphic symbols.

This disclosure provides containers for food or drink in which an internal and/or external surface is provided with a chemical feature that renders the surface more receptive to the adhesive of adhesive labels. The chemical feature may be provided as a coating or by mixing the chemical with the material of the container during manufacture. Thus, the containers may be infused with the chemical that is used to increase the adhesion of the labels.

The adhesive paper products or labels may be repositionable or removable. Such labels typically do not have a very strong adhesive, so that they can be readily moved around on or removed from the container to which they are applied.

These adhesive paper products or labels may advantageously be self-cleaning of the printer components that may come into contact with the adhesive of the labels, such as in a POS printer.

This disclosure particularly relates to disposable containers, such as bags, boxes and clam-shell containers. They are typically recyclable and environmentally friendly. The containers herein may be made from materials derived from naturally occurring products, for example paper, cardboard and plant fiber products, such as those derived from sugar cane processing, known as bagasse or bamboo or wheat straw.

Containers made from such materials, or other materials, may have uneven surfaces, such as a corrugated surface, or fibrous surfaces, from which hairs or fibers extend. These surface features make it difficult for removable labels to adhere and, rather, they have a tendency to be easily dislodged or even fall off.

The compositions in this disclosure, whether coatings or otherwise, address such shortcomings and provide a surface or surfaces on the containers that improves the bond or adhesion of temporary or removable adhesive labels by means of the compositions having an affinity for the adhesive.

The containers of this disclosure are particularly useful in the fast food industry, as well as in restaurants, hospitals, and other eating or food supply establishments, such as supermarkets and grocery stores. The containers may be for hamburgers and other fast foods; pizza boxes and the like. For example, many standard pizza boxes have outer surfaces that are uncoated corrugated materials. This surface is very difficult for a repositionable label to stick to. By spot coating a composition with the functionality described herein, for example of the front short edge of the pizza box, a repositionable label will easily stick.

The containers of this disclosure may be bags or boxes that are used to carry food or drink items. Such containers may be used to carry food or drink items that are in additional containers, which may be regular containers or those of this disclosure. Such carry containers can be bags and boxes used for delivery of food or drink items to customers. The aforesaid containers may be used in conjunction with the repositionable or removable disclosed herein.

The adhesive of the labels has relatively low tack. This disclosure also provides a label system that has a new stronger bond by virtue of the interaction between the adhesive of the label and the chemical in or on the containers of this disclosure. The new level of bond can be equivalent to that of a semi-permanent or permanent adhesive. Such label systems can also be used as tamper evident closures for containers or carriers for food or drink by virtue of being tamper evident, because the degree of adhesion is greater than the tear strength of the of the label.

This disclosure provides containers for food or drink, comprising a base portion; a plurality of walls extending from said base portion to define a receptacle portion for receiving food or drink; the walls having inner and outer surfaces; the inner and/or said outer surfaces being made of a container material; a zone of the container bearing a coating that meets a safety standard for food contact surfaces; the coating having an affinity for the adhesive of removable or repositionable adhesive labels by enhancing the adhesion of such adhesives to the material.

This disclosure provides a method of enhancing the receptivity of a surface of a food or drink container to the adhesive of a removable or repositionable label. The method may comprise applying a coating having an affinity for the adhesive to at least a portion of the surface of said container and drying the coating or allowing it to dry, the coating being compliant with food contact regulations.

This disclosure provides a method of enhancing the ability of a removable or repositionable adhesive label to adhere to a container for food or drink, which comprises providing a container made from a natural material and having at least one surface bearing a coating; providing a removable or repositionable label having an adhesive coating and contacting the adhesive of the label with the coating on the container, the coating on the container having an affinity for the adhesive such that the adherence of the label to the container is improved compared to the adherence of the label to the material.

The containers of this invention can comprise a top or lid portion, which may be attached to the base portion, for example to at least one of the walls. The attachment may be by means of a hinge portion connecting the base and top portions together. The container can be a clamshell food container.

The coating can be applied to at least one of the inner and/or outer surfaces of the container. For example, the coating can be applied to at least the top or lid portion. The coating may cover some or all of such surfaces, including the top surface of the lid portion. Thus, the entire outer and/or inner surface of the container may be covered by the coating, or the entire surface of the container may be activated with respect to the label adhesive by incorporating the activator into the container during its manufacture.

Typical steps in the manufacturing process include: preparing a fiber pulp; dewatering and forming the pulp into a semi-finished product and then drying and shaping that product and cutting and sterilizing the dried product.

Suitable coatings for foods containers include Craigcoat 3992PMR-FC from Royal Adhesives.

The adhesive is preferably a microsphere adhesive which typically has desirable adhesion versus removability properties. Microsphere adhesives are typically composed of spheres measuring about 10 to 250 microns in diameter, preferably from 25 to 50 microns, which form an uneven film, limiting the amount of surface area contact between adhesive and substrate because of the microspheres. Suitable adhesives can be obtained from Franklin Adhesives or National Starch, with preferable adhesives available from Royal Adhesives under product number 3991 PLV and Craigbond 3991 from Royal Adhesives. Franklin Adhesives offers a product: Micronax 250-00 and this is a microsphere repositionable adhesive. Other products can be use on containers or surfaces that do not require an FDA compliant coating, such as Micro Primer 10 coating from DGC Enterprises Inc. Particle repositionable type adhesives may also be used. Repositionable adhesives of this type are available through companies like Cal Chemical Corp. and Aqua Based Technologies.

Suitable labels are disclosed in U.S. Pat. Nos. 9,058,753, 9,437,122, and 9,925,815, which are hereby incorporated by reference in their entireties.

Labels, such as those described herein, are useful articles in a variety of industries and facilitate the conveyance of information. They may, for example, convey information about the food or drink in the containers they are attached to, such as pricing, special features of an order, the identity of the intended customer, and the like. They may also need to be removed without damaging the surface or leaving a residue on the surface to which they have been applied.

The adhesive paper products, such as labels, are typically made from thermal paper. The paper is particularly suited for use in point-of-sale (POS) printers. The labels may be self-cleaning of printer components they come in to contact with.

The adhesive may be located on the label in discrete areas, typically in a pattern, such as patches, islands or spots, repeated along the label, in one or more layers, but typically two, on top of one or more layers, but typically one, of material having an affinity for the adhesive, so that material acts as a cleaning agent or cleaning layer(s) for the adhesive.

The adhesive may be have been applied in a relatively light (such as 2 or less gsm dry, for example 1-1.5 gsm), base comprising one or more layers, but typically one, on one or more layers of such material having an affinity for the adhesive, but typically one, with one or more additional layers of adhesive over the adhesive base layer(s) in the form of such discrete areas of adhesive (in one or more layers, but typically one or two) (the base layer forming or the base layers together forming one or more continuous or substantially continuous columns, so that the base layer(s) adhesive extends across the width of the label or leaves adhesive free zones running along the edges of the roll or is in a column or columns on each side of the longitudinal axis of the label.

The adhesive is a temporary, non-permanent or pressure sensitive adhesive. The adhesive may be a water based adhesive and therefore an aqueous formulation. Preferred adhesives are environmentally sound and avoid use of solvents. Preferred adhesives are microsphere adhesives, although a repositionable, removable, or low-tack permanent adhesive can be used. UV curable adhesives can also be used.

The adhesive can be on the labels in various patterns. The adhesive can be non-continuous along the longitudinal length of the label. Some preferred patterns include discrete shapes surrounded by areas of non-adhesive, such as the cleaning material. Suitable shapes include squares, rectangles, circles, ovals, polygons, diamonds and parallelograms.

The labels may be made from lightweight paper, for example 80 gsm or less, such as 70 gsm or less. This provides adhesive paper products that are less expensive than higher weight papers. This also provides labels having the potential adhesive performance that would normally require much heavier paper. Some can handle a flood coat of adhesive if heavier paper is used, for example 70+ gsm. The adhesive may be flood coated with between 4-20 gsm dry of adhesive, and preferably between 7-12 gsm dry.

BRIEF DESCRIPTION OF THE DRAWINGS

Some preferred features of this disclosure will now be more particularly described by reference in and to the following figures, which are only exemplary of the disclosure.

DETAILED DESCRIPTION

Figure 1:
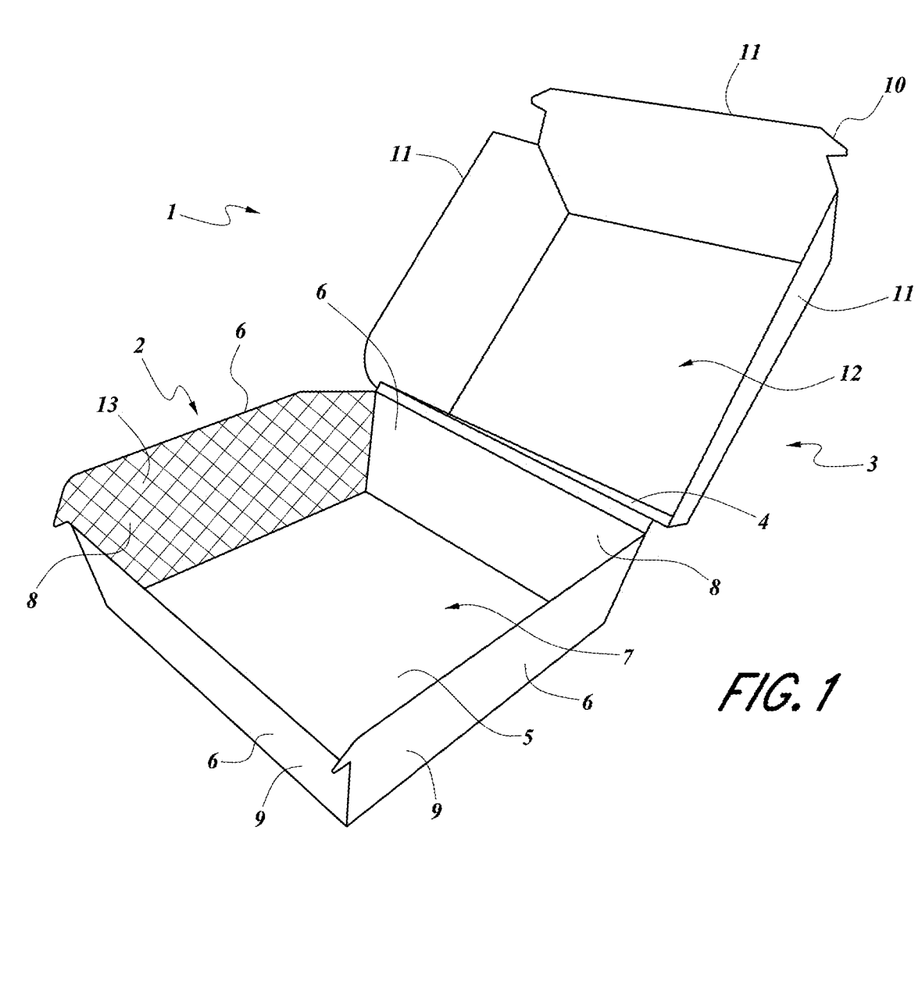
FIG. 1 is a perspective view of a food container according to this disclosure showing schematically the location of an adhesive receptive coating.

FIG. 1 illustrates a food container (1) according to the invention and comprising a base portion (2) and a top portion (3). Base portion (2) and top portion (3) are connected together by a hinge portion (4). Base portion (2) comprises a bottom (5), from which extend walls (6), which together form a receptacle portion (7) for receiving food (not shown). The walls (6) each have an inner surface (8) and an outer surface (9). Top portion (3) comprises a top (10) from which extend, towards the base portion (2), walls (11). Top (10) and walls (11) together form a cover portion (12), which is sized to cover the base portion (2) and any food therein. The inner surface (8) of one wall (6) is provided with a coating (13), which enhances the ability of a removable label (not shown) to stick to the container (1). While coating on the outer surfaces are preferred, such inner surface coating may be appropriate, for example when using inkjet printed labels.

Figure 2:
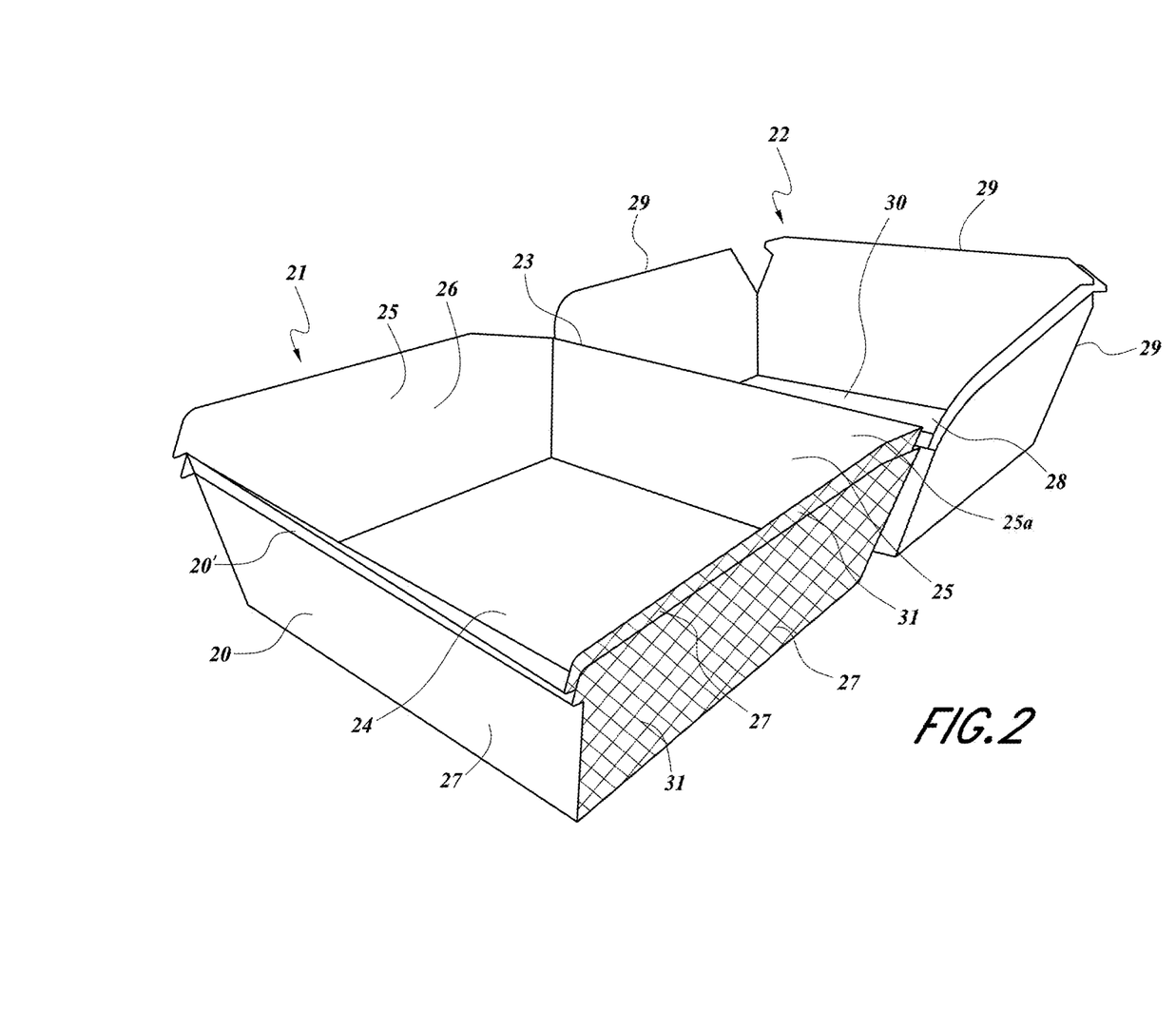
FIG. 2 is a perspective view of two food containers according to this disclosure nested together and showing schematically the location of an adhesive receptive coating.

FIG. 2 illustrates two food containers (20 and 20') according to the invention and similar to that shown in FIG. 1 that are nested together and each comprise a base portion (21) and a top portion (22). Base portion (21) and top portion (22) are connected together by a hinge portion (23). Base portion (21) comprises a bottom (24), from which extend walls (25), which together form a receptacle portion (25a) for receiving food (not shown). The walls (25) each have an inner surface (26) and an outer surface (27). Top portion (22) comprises a top (28) from which extend walls (29). Top (28) and walls (29) together form a cover portion (30), which is sized to cover the base portion (21) and any food therein. The outer surface (27) of one wall (25) of each container is provided with a coating (31), which enhances the ability of a removable label (not shown) to stick to the containers (20 and 20').

Such food containers are typically shipped nested together, for ease of packaging and handling. The outer surfaces (27) of walls (27) are therefore frequently in contact with the inner surfaces (26) of walls (27). Since the inner surfaces are food contact surfaces, coating (31) will be in contact with food contact surfaces and therefore it is important that the coating material complies with safety regulations for food contact surfaces.

Figure 3:
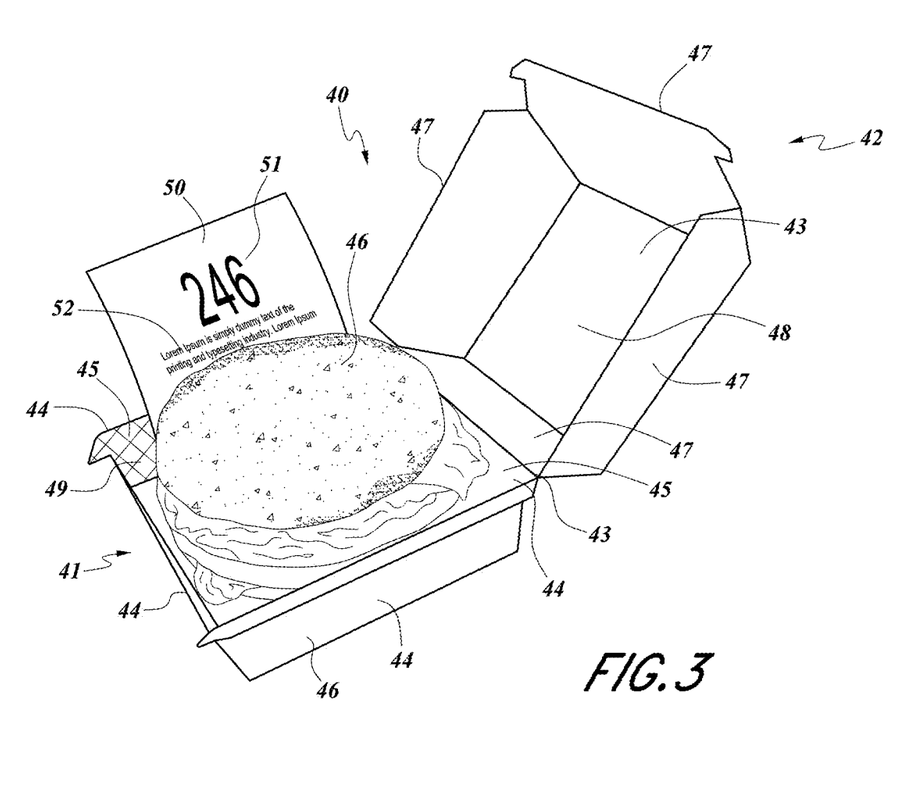
FIG. 3 is a perspective view of a food container according to this disclosure showing food and, schematically, the location of an adhesive receptive coating and a repositionable adhesive label attached thereto.

FIG. 3 illustrates a food container (40) according to the invention and similar to that of FIG. 1 and comprising a base portion (41) and a top portion (42). Base portion (41) and top portion (42) are connected together by a hinge portion (43). Base portion (41) comprises a bottom (not shown), from which extend walls (44), which together form a receptacle portion (45) for receiving food (46). The walls (44) each have an inner surface (45) and an outer surface (46). Top portion (42) comprises a top (43) from which extend, towards the base portion (41), walls (47). Top (43) and walls (47) together form a cover portion (48), which is sized to cover the base portion (41) and food (46). The inner surface (45) of one wall (44) of base portion (41) is provided with a coating (49), which enhances the ability of a removable label (50) to stick to the container (40). Label (50) is printed with a customer identifier (51) and with information (52) relating to the food ordered.

Figure 4:
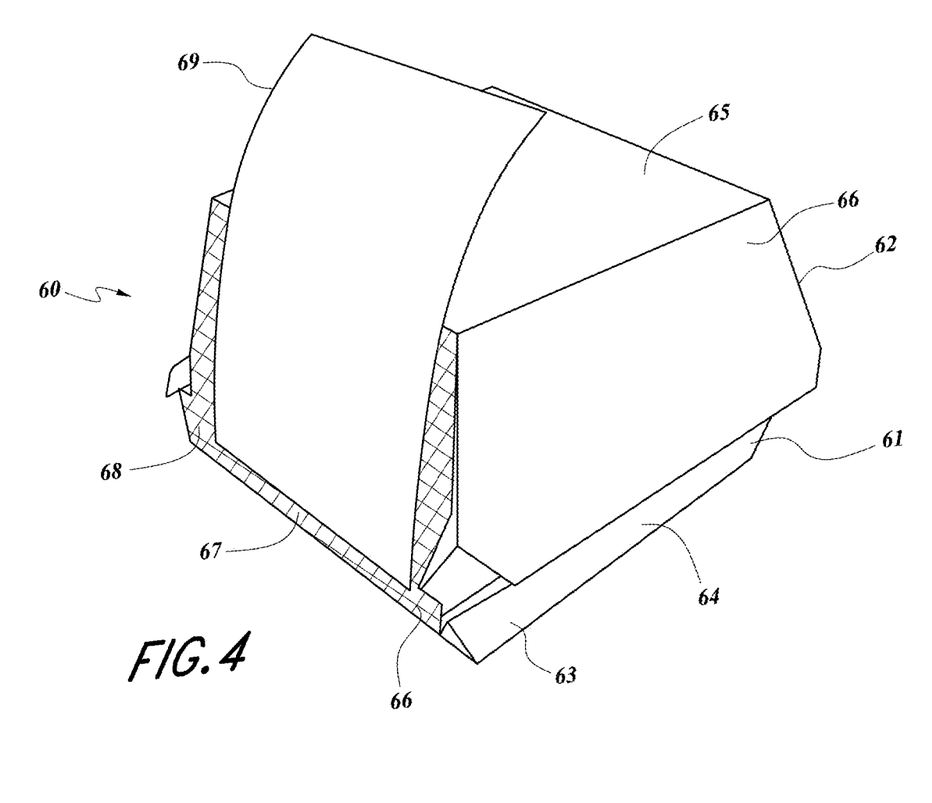
FIG. 4 is a perspective view of a food container according to this disclosure showing schematically the location of an adhesive receptive coating and a repositionable label attached thereto.

FIG. 4 illustrates a food container (60) according to the invention and similar to that of FIG. 1 and shown closed. The container (60) comprising a base portion (61) and a top portion (62). Base portion (61) and top portion (62) are connected together by a hinge portion (not shown). Base portion (61) comprises side walls (63), which together form a receptacle portion for receiving food (not shown). The walls (63) each have an outer surface (64). Top portion (62) comprises a top (65) from which extend, towards the base portion (61), walls (66). Top (65) and walls (66) together form a cover portion, which is sized to cover the base portion (61) and food (not shown). The outer surface (67) of one wall (66) of top portion (62) is provided with a coating (68), which enhances the ability of a removable label (69) to stick to the container (60).

Figure 5:
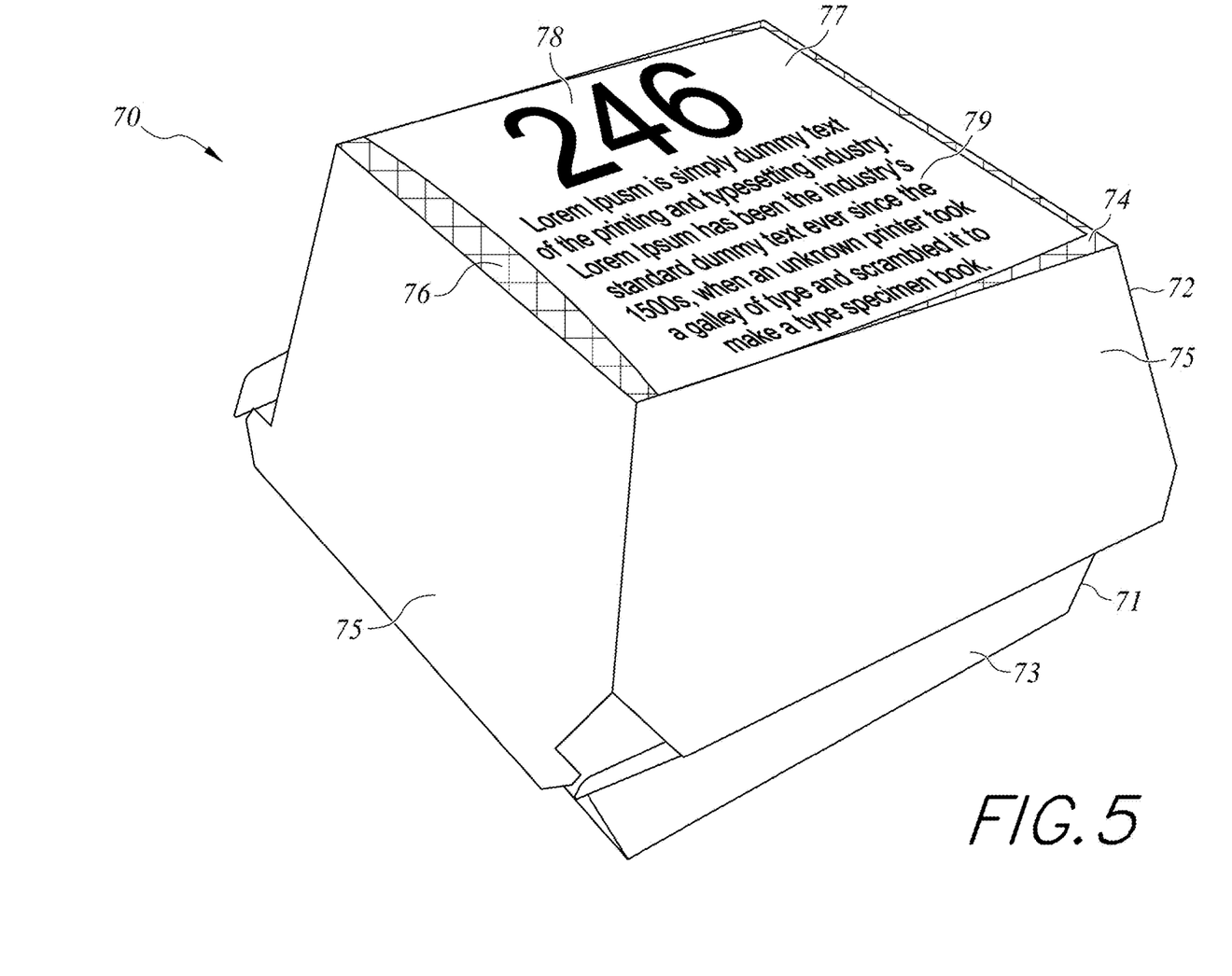
FIG. 5 is a perspective view of a food container according to this disclosure showing schematically the location of an adhesive receptive coating and a repositionable label attached thereto.

FIG. 5 illustrates a food container (70) according to the invention shown closed and similar to that of FIG. 4. The container (70) comprising a base portion (71) and a top portion (72). Base portion (71) and top portion (72) are connected together by a hinge portion (not shown). Base portion (71) comprises side walls (73), which together form a receptacle portion for receiving food (not shown). Top portion (72) comprises a top surface (74) from which extend, towards the base portion (71), walls (75). Top (74) and walls (75) together form a cover portion, which is sized to cover the base portion (71) and food (not shown). The top surface (74) is provided with a coating (76), which enhances the ability of a removable label (77) to stick to the container (70). The label (77) is printed with a customer identifier (78) and information (79) relating to the food ordered.

Figure 6:
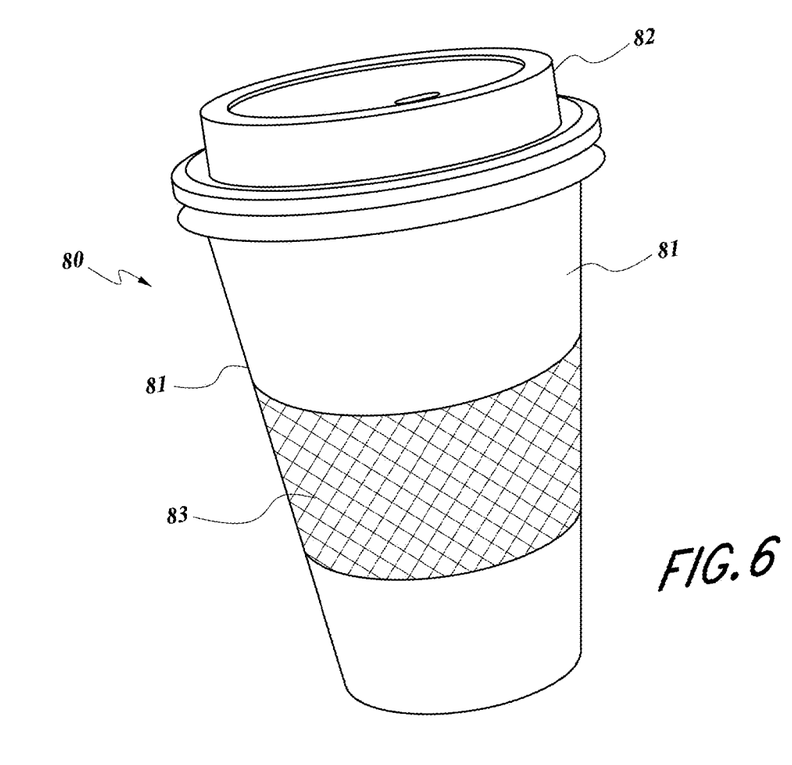
FIG. 6 is a perspective view of a drink container according to this disclosure showing schematically the location of an adhesive receptive coating.

FIG. 6 illustrates a drink container (80) according to the invention and comprising a bottom portion (not shown) from which walls (81) extend upwardly to form between them a receptacle portion (not shown) for containing a drink. A top portion (82) is removable attached to the top of the walls (81). Around the walls (81) is provided a coating (83) which enhances the ability of a removable label (not shown) to stick to container (80).

Figure 7A:
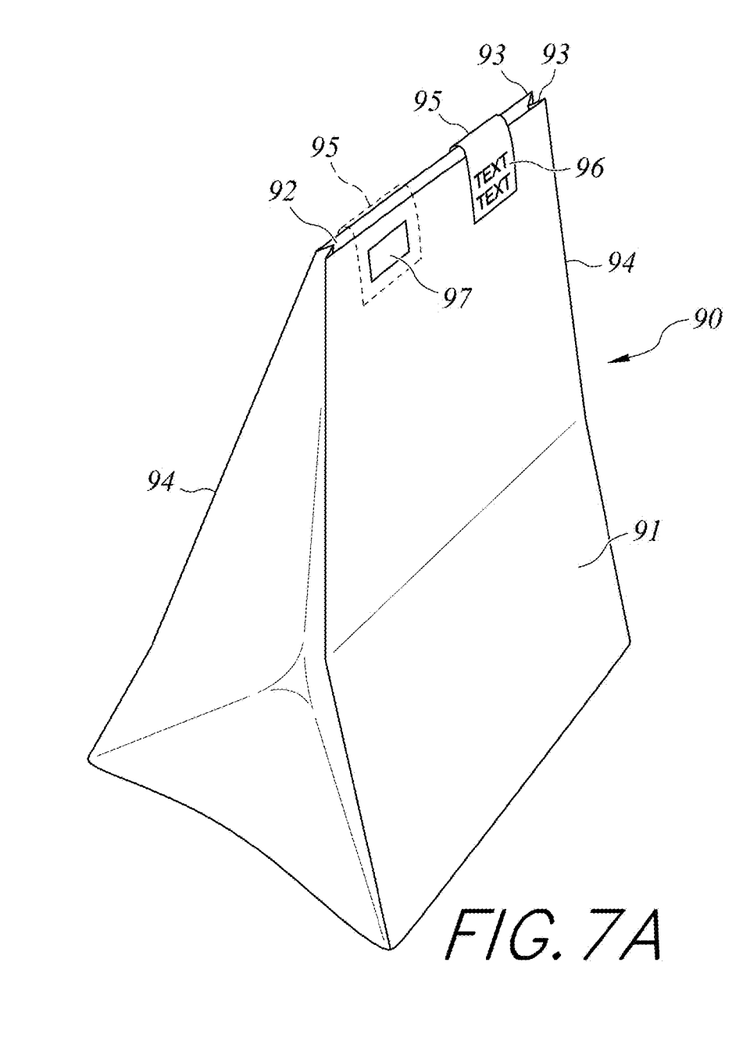
FIG. 7A is a perspective view of a bag having its opening closed by pressure sensitive adhesive tamper evident labels.

FIG. 7A illustrates a bag (90), for example a delivery bag containing food (not shown) in which the bag (90) is made of recycled stock and has an exterior surface (91) that contains a high amount of loose fibers. Regular repositionable pressure sensitive adhesive tags are very difficult to attach to this kind of surface. The opening (92) of the bag is formed by upper edges (93) of the walls (94) of the bag and is closed by repositionable pressure sensitive adhesive tags (95) made of lightweight paper. The tags or labels (95) are made of thermal paper and from a POS printer at the restaurant or fast food location have been printed with information (96) relating to the food ordered, the customer and the delivery location. The bag surface (91) is provided with areas (97) coated with a composition having an affinity for the adhesive so as to transform the repositionable tags into labels having such adhesive bonding to the bag (90) that the bag cannot be opened to reach the food within without tearing the labels (95). The labels (95) are thus tamper evident.

Figure 7B:
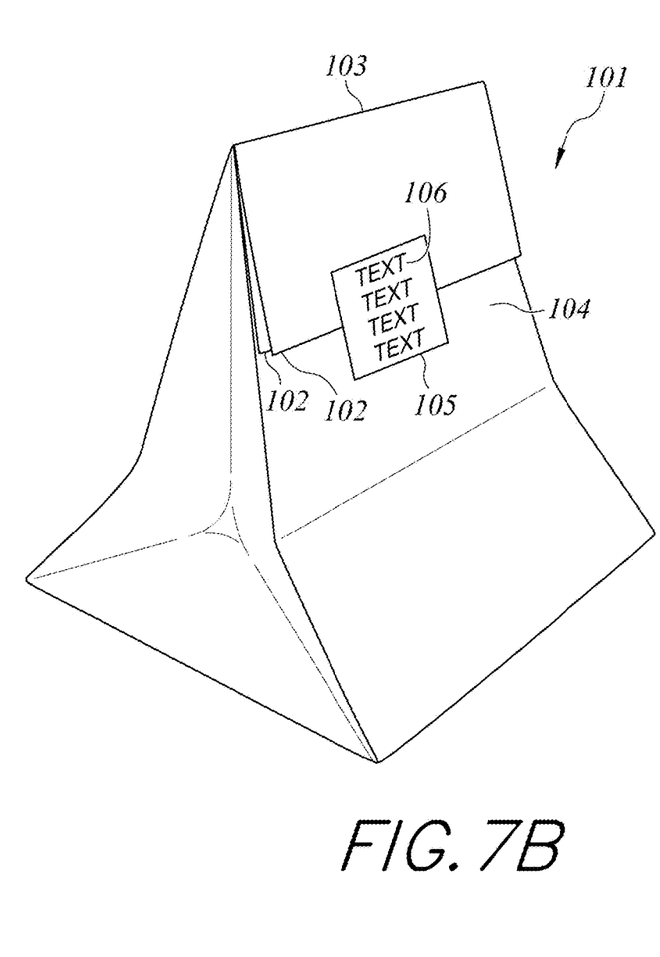
FIG. 7B is a perspective view of a bag having its opening closed folding and the fold attached to the bag by pressure sensitive adhesive tamper evident labels.

FIG. 7B illustrates a bag (101) similar to that shown in FIG. 7A, but with the upper edges (102) folded over (as at (103)) and attached to the exterior surface (104) of the bag (101) by means of a repositionable pressure sensitive adhesive tag (105) made of lightweight paper similar to that shown in FIG. 7A. The tag or label (105) is printed with information (106) relating to the food ordered, the customer and the delivery location The bag surface (104) is provided with an area (not shown) coated with a composition having an affinity for the adhesive so as to transform the repositionable tag into a label having such adhesive bonding to the bag (101) that the bag cannot be opened to reach the food within without tearing the label (105). The label (105) is thus tamper evident.

Examples

In the following examples various commercial packaging products were provided with or without a coating having a functionality to interact with a pressure sensitive adhesive.

In the examples repositionable pressure sensitive adhesive paper was cut into tape 24 mm wide tape. The patches of adhesive with adhesive pattern type paper were justified center of the 24 mm strip. After a dwell time of 5 minutes, the tape was pressed onto either the uncoated or coated substrate and subjected to a peel strength test in accordance with ASTM method ASTM D3330 (Method F) also known as PSTC (Pressure Sensitive Tape Council) 101 (Method F). Thus, the adherence of the tape was measured when peeled at a 90 degree angle to the surface of the indicated products at a rate of 12 inches per minute. The force required to effect peel was measured. The equipment used was a MARK-10 ESM 303 force test stand with a DC4060 controller and a M5-2 force gauge, each manufactured by Mark-10 Corporation.

The packaging products were a sandwich box (from McDonalds), a paper cup (a McCafe paper cup from McDonalds), a pizza box (from Avicolli's Pizza), a bagasse clam shell container (from McDonalds) and a recycled paper bag (from Sweet Green). These products were tested having a surface coated with the said functionality and the same product surfaces uncoated to provide comparative examples.

The coating material used was 3992PMR Primer from Royal Adhesives. The coating was applied to the surface in the amount of 0.5-3.0 g/sm. The adhesive tapes were single coated with the adhesive in discrete areas in three different coating weights of 10, 9, and 14 grams per square meter. These are identified as product 1, 2, and 3, respectively, and are available from Documotion Research Inc. as Sticky-POS® BT 80X350, INO 80X350 and 2HT-14 40X250, respectively. The adhesive was 3991PLV Repositionable Glue from Royal Adhesives.

The peak peel values and their averages are summarized in Table 1 and the Peel test graphs for the respective examples are shown in examples 1 to 30, with the X axis representing time and the Y axis units in gF. Because of the adhesive being in discrete areas on the test tape, the peel test results drop to zero in the spaces between the adhesive areas.

Table 2 summarizes the adhesion peel test results of Examples 1 to 30 expressed as the percent increase in the average peel values for each packaging substrate and using pressure sensitive adhesive tape products 1-3.

Table 3 summarizes the adhesion peel test results of Examples 1 to 30 expressed as the number of times stronger the adhesion of the pressure sensitive adhesive tape is for each packaging substrate.

What is claimed is:

1. A food or drink delivery bag and label combination using a repositionable label to create a tamper evident bag closure, the combination comprising:
   a bag having a base portion and first and second walls extending from the base portion to define a receptacle for receiving at least one item through an opening of the bag;
   the first and second walls having exterior surfaces;
   the repositionable label containing a microsphere adhesive on at least a portion of one side, the repositionable label printed on the other side with information relating to food or drink in the bag;
   at least a portion of the exterior surface of the first wall containing a coating;
   at least a portion of the exterior surface of the second wall containing a coating;
   the repositionable label being situated with the microsphere adhesive to contact the coatings on the first and second walls, thereby closing the opening of the bag;
   wherein the coatings on the first and second walls (a) contain amorphous silica and a binder and (b) have an affinity for the microsphere adhesive such that the repositionable label becomes non-repositionable upon contact with the coatings on the first and second walls thereby creating the tamper evident bag closure.

2. The combination of claim 1 wherein the binder comprises acrylic, vinyl acetate, urethane or polyvinyl alcohol or an acrylonitrile or copolymer of styrene butadiene in combination with an aminoplast resin and/or aliphatic epoxy resin.

3. The combination of claim 2 wherein the coatings on the first and second walls comprise 3% to 20% by dry weight of amorphous silica.

4. The combination of claim 2 wherein the coatings on the first and second walls comprise 50% to 95% by dry weight of a binder.

5. The combination of claim 1 wherein the at least the portion of the exterior surface of the first wall containing the coating and the at least the portion of the exterior surface of the second wall containing the coating are both located near upper edges of the walls.

6. The combination of claim 1 wherein the at least the portion of the exterior surface of the first wall containing the coating is located near an upper edge of the first wall and wherein the at least the portion of the exterior surface of the second wall containing the coating is not located near an upper edge of the second wall.

7. The combination of claim 6 wherein the upper edges of the first and second walls are folded over and attached by the label to the second wall.

8. The combination of claim 1 wherein the bag cannot be opened to access contents without tearing the repositionable label and disrupting a surface of the first and/or second wall, such that the bag is tamper evident.

9. The combination of claim 1 wherein the repositionable label is comprised of thermal paper.

10. The combination of claim 1 wherein the repositionable label is printed by a point-of-service (POS) printer at a restaurant or fast food location.

11. The combination of claim 1 wherein the exterior surfaces of the first and second walls are rough, fibrous and/or uneven.

12. A food or drink delivery bag and label combination using a repositionable label to create a tamper evident bag closure, the combination comprising:
    a bag having a base portion and first and second walls extending from the base portion to define a receptacle for receiving at least one item through an opening of the bag;
    the first and second walls having exterior surfaces;
    the repositionable label containing a microsphere adhesive on one side, the repositionable label printed with information relating to food or drink in the bag;
    at least a portion of the exterior surface of the first wall containing a coating near an upper edge of the first wall;
    at least a portion of the exterior surface of the second wall containing a coating;
    the repositionable label being situated with the microsphere adhesive to contact the coatings on the first and second walls, thereby closing the opening of the bag;
    wherein the coatings on the first and second walls have an affinity for the microsphere adhesive such that the repositionable label becomes non-repositionable upon contact with the coatings on the first and second walls thereby creating the tamper evident bag closure; and,
    wherein the coatings on the first and second walls contain 3% to 20% by dry weight amorphous silica and 50% to 95% by dry weight of a binder, the binder comprising acrylic, vinyl acetate, urethane or polyvinyl alcohol or an acrylonitrile or copolymer of styrene butadiene in combination with an aminoplast resin and/or aliphatic epoxy resin.

13. The combination of claim 12 wherein the exterior surfaces of the first and second walls are rough, fibrous and/or uneven.

14. The combination of claim 12 wherein the at least the portion of the exterior surface of the second wall containing the coating is located near an upper edge of the second wall.

15. The combination of claim 12 wherein the at least the portion of the exterior surface of the second wall containing the coating is not located near an upper edge of the second wall.

16. The combination of claim 15 wherein the upper edges of the first and second walls are folded over and attached by the repositionable label to the second wall.

17. The combination of claim 12 wherein the bag cannot be opened to access contents without tearing the repositionable label and disrupting a surface of a first and second wall, such that the bag is tamper evident.

18. The combination of claim 12 wherein the repositionable label is comprised of thermal paper.

19. The combination of claim 18 wherein the repositionable label is printed by a point-of-service (POS) printer at a restaurant or fast food location.

\* \* \* \* \*